US008131677B2

(12) United States Patent
Hsu (10) Patent No.: US 8,131,677 B2
(45) Date of Patent: *Mar. 6, 2012

(54) SYSTEM AND METHOD FOR EFFECTING INFORMATION GOVERNANCE (75) Inventor: Windsor Wee Sun Hsu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 668 days.

This patent is subject to a terminal disclaimer.

(21) Appl. No.: 12/130,976

(22) Filed: May 30, 2008

(65) Prior Publication Data

US 2009/0049515 A1 Feb. 19, 2009

Related U.S. Application Data (63) Continuation of application No. 11/422,162, filed on Jun. 5, 2006, now Pat. No. 7,587,418.

(51) Int. Cl.
*G06F 17/30* (2006.01)
(52) U.S. Cl. ......... 707/626; 707/781; 707/610; 707/706
(58) Field of Classification Search .................. 707/626, 707/781, 694, 706, 955, 610; 709/223
See application file for complete search history.

(56) References Cited

U.S. PATENT DOCUMENTS

| 2005/0223277 | A1* | 10/2005 | Ballard | 714/15 |
|---|---|---|---|---|
| 2005/0226059 | A1* | 10/2005 | Kavuri et al. | 365/189.05 |
| 2006/0092024 | A1* | 5/2006 | Kim et al. | 340/572.1 |
| 2008/0010377 | A1* | 1/2008 | Nissennboim | 709/226 |

OTHER PUBLICATIONS

Rinard, Martin et al., "Eliminating Synchronization Bottlenecks Using Adaptive Replication", ACM Transactions on Programming I U Languages and Systems, vol. 25 No. 3, p. 316-359 [online] May 2003 [retrieved on Apr. 21, 2009]. Retrieved from the Internet: <URL: http://portal.acm.org/ft_gateway.cfm?id =641911 &type=pdf&coll=ACM&dl=.
Dreyer, Werner, "A Meta Model and an Infrastructure for the Non-Transparent Replication of Object Databases", CIKM 2000, PV 344-351, [online] Nov. 2000 [retrieved on Apr. 21, 2009]. Retrieved from the Internet: <URL: http://portal.acm.org/ft_gateway. cfm?id=354839&type=pdf&coll=ACM&dl=ACM &CFID=31347884&CFTOKEN;::19263854>.
Cardellini, Valeria et al., "The State of the Art in Locally Distributed Web-Server Systems", ACM Computing Surveys, vol. 34, W No. 2, p. 263-311 [online] Jun. 2002 [retrieved on Apr. 21, 2009]. Retrieved from the Internet: <URL: http://portal.acm.org /ft_gateway. cfmid=508355&type=pdf&coll=ACM&dl=ACM &CFID=31347884&CFTOKEN=19263854>=AC~il &CFID=31347884&CFTOKEN=19263854>.
U.S. Office Action dated Dec. 10, 2008 for U.S. Appl. No. 11/422,162.
Notice of Allowance dated Apr. 30, 2009 for U.S. Appl. No. 11/422,162.

* cited by examiner

Primary Examiner — Giovanna Colan
Assistant Examiner — Dennis Myint
(74) Attorney, Agent, or Firm — Kenneth L. Sherman, Esq.; Michael Zarrabian, Esq.; Myers Andras Sherman & Zarrabian LLP (57) ABSTRACT A method to manage data located on networked devices is provided. The method includes replicating objects residing on the devices and collecting information about at least one of the objects or the devices. The method further includes receiving input on desired information governance policies and outcomes and analyzing the replicated objects, collected information and received input to determine an information governance action.

42 Claims, 9 Drawing Sheets

SYSTEM AND METHOD FOR EFFECTING INFORMATION GOVERNANCE

FIELD OF THE INVENTION

The present invention generally relates to managing data, and more specifically, this invention pertains to a system and method for information governance.

BACKGROUND

In today's information-driven society, organizations are collecting and accumulating more electronic information than ever before. Such information may form the basis for key decisions in business operations and other critical activities. Ensuring that the information is available and readily accessible is therefore vital. Such information may also be confidential and sensitive, and therefore should be carefully protected from improper disclosure. Moreover, a growing portion of the information is often subject to regulations that specify how it should be managed. An organization often needs to properly dispose of information that is no longer useful to the organization and have passed any mandated retention period.

The rapidly growing volume of accumulated information is increasingly distributed among and replicated on many computing devices including servers, workstations, personal computers (PCs), and mobile devices such as tablet PCs, laptops, personal digital assistants (PDAs), cellular telephones, etc.

Figure 1:
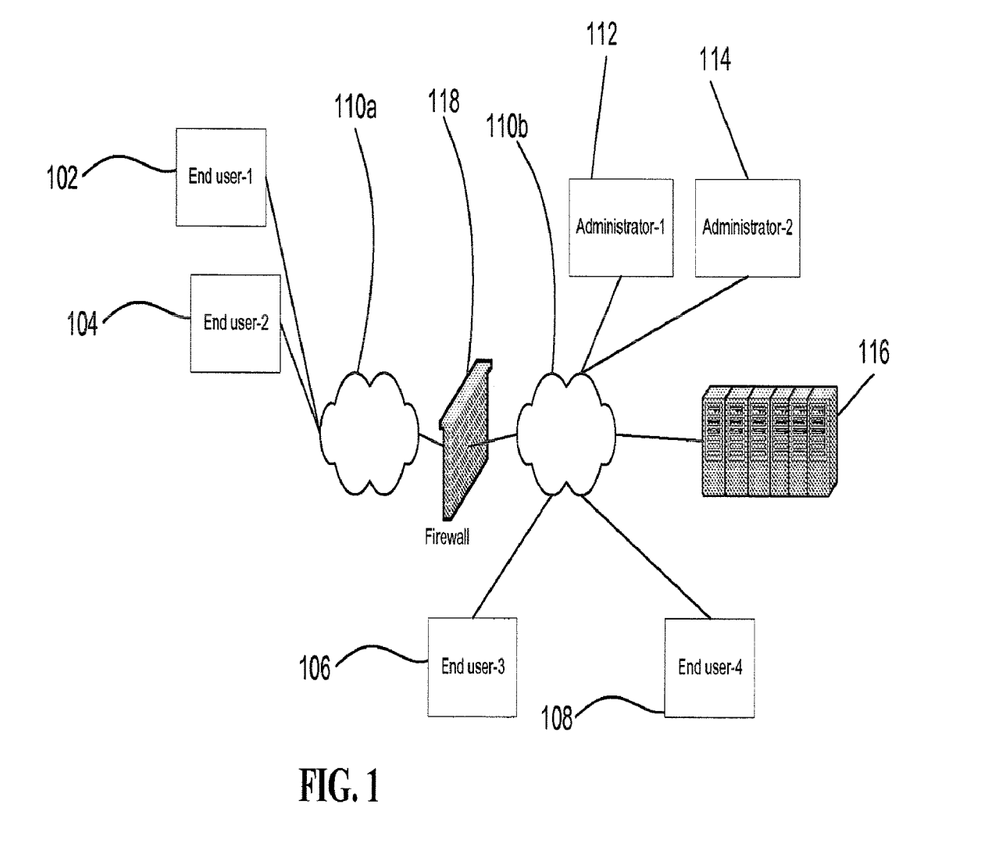
FIG. 1 shows a typical data management system in an organization.

FIG. 1 shows a typical data management system in an organization. Access to a data center 116 is accomplished over networks 110b and/or 110a and a firewall 118. The information that resides in the data center 116 tends to be managed by information technology (IT) personnel 112 and 114, but a lot of the information in an organization increasingly resides on devices such as PCs, laptops, etc. which are under the control of the end-users 102, 104, 106, and 108. In many cases, the data center comprises servers, some of which are physically distributed, often across geographic distances.

It is thus very difficult to manage all the information in an organization. In fact, simply determining what information exists in an organization, where it is maintained, and how it is being maintained is a major challenge. This means, for example, that an object (e.g., file, document, record, table, database) that should have been disposed of could continue to exist somewhere in the organization (e.g., on somebody's laptop). The organization may have guidelines and policies on how the information should be managed but there is generally no capability to audit or enforce the guidelines and policies. For example, the organization may have a policy that confidential information should only be placed on laptop computers on an as-needed basis, but it would not be able to easily check for compliance with the policy. The result is that if a laptop computer is lost or stolen, confidential information could be unnecessarily exposed. As more information is stored and moved on portable devices, this is a huge and growing problem.

In view of the foregoing, there is a need for a more efficient and intelligent method of managing information governance, which includes ensuring the quality, consistency, usability, security, privacy, availability, etc. of an organization's information.

SUMMARY

A method for intelligently and powerfully governing information. It should be appreciated that the present invention can be implemented in numerous ways, such as a process, a service, an apparatus, a system, a device or a method on a computer readable medium. Several inventive embodiments of the present invention are described below.

In one embodiment, a method to manage data located on networked devices is provided. The method includes replicating objects residing on the devices and collecting information about at least one of the objects or the devices. The method further includes receiving input on desired information governance policies and outcomes and analyzing the replicated objects, collected information and received input to determine an information governance action.

In another embodiment, a computer readable media having program instructions for managing data located on networked devices is provided. The computer readable media includes program instructions for replicating objects residing on the devices and program instructions for collecting information about at least one of the objects or the devices. The computer readable media further includes program instructions for receiving input on desired information governance policies and outcomes and program instructions for analyzing the replicated objects, collected information and received input to determine an information governance action.

In yet another embodiment, a system for managing data located on networked devices is provided which includes replicating objects residing on the devices and collecting information about at least one of the objects or the devices. The system further includes receiving input on desired information governance policies and outcomes and analyzing the replicated objects, collected information and received input to determine an information governance action.

In another embodiment, a service to assist in managing data located on networked devices is provided which includes replicating objects residing on the devices and collecting information about at least one of the objects or the devices. The service further includes receiving input on desired information governance policies and outcomes and analyzing the replicated objects, collected information and received input to determine an information governance action.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

An invention is provided for intelligently and powerfully governing information. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Embodiments of the present invention effectively provide methods and systems for managing information governance and providing information governance services. In general terms, embodiments of the present invention include: (1) replicating objects (e.g., files, documents, records, tables, databases) residing on devices (e.g., servers, workstations, PCs, tablet PCs, laptops, PDAs, cellular telephones); (2) collecting information about the objects and/or devices including device attributes, object management polices, and object usage statistics; (3) receiving input on desired information governance policies and outcomes; and (4) analyzing the replicated objects, collected information about the objects and/or devices, and received input on desired information governance policies and outcomes to determine an information governance action. The information governance action, in one embodiment, may include one or more of: (1) properly disposing information; (2) preserving information security/privacy; (3) conducting information life management (ILM) across a network/enterprise; (4) holistically retrieving for search and backup/restore; and (5) applying consolidation and control over the information in the network/enterprise. Therefore, embodiments of the present invention effectively governs (i.e., ensure the quality, consistency, usability, security, privacy, availability etc. of) an organization's information.

Figure 2:
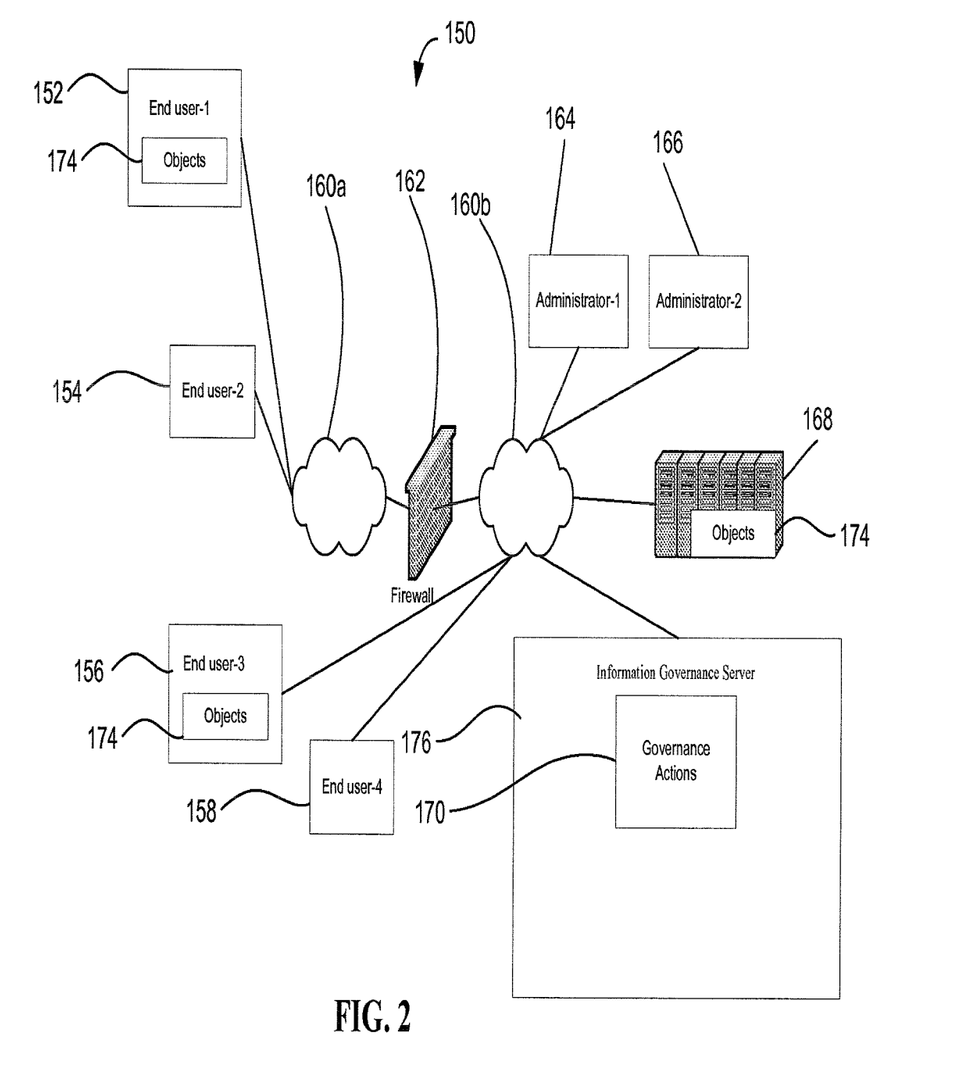
FIG. 2 illustrates an information governance environment in accordance with one embodiment of the present invention.

FIG. 2 illustrates an information governance environment 150 in accordance with one embodiment of the present invention. It should be appreciated that the environment 150 may be any suitable type of enterprise network where data may be stored and managed. In one embodiment, the governance environment 150 includes end users such as, for example, end-users 152, 154, 156, and 158 accessing a data center 168 through networks 160b and/or 160a and a firewall 162. The environment 150 further may include IT administrators such as, for example, administrators 164 and 166. The environment 150 also includes a data center 168 containing one or more servers, which may be geographically distributed, that can serve as an exemplary data storage. The environment 150 also includes an information governance server 176 which, in one embodiment, enables the managing of data such as, for example, objects 174 subject to desired policies/regulations applied by the IT administrators. In one embodiment, the information governance server 176 may generate desired governance actions 170 which facilitate governance of information in the environment 150, including data in the data center 168 and/or devices such as, for example, those utilized by one or more of end-users 152, 154, 156, and 158. It should be appreciated that any suitable device such as, for example, servers, workstations, PCs, tablet PCs, laptops, PDAs, cellular telephones, etc. and the data contained therein which can be accessed by the information governance server may be intelligently managed to comply with the desired policies/regulations of an organization. It should further be appreciated that the access to the data may be intermittent as devices may be disconnected from and reconnected to the network.

Information governance as described herein, in one embodiment, may be provided by analyzing information replicated for data loss protection purposes. In an embodiment of the present invention, objects 174 residing on the various devices are replicated as part of a data loss protection process. Then an embodiment of the present invention may analyze the replicated objects and collected device attributes, object management policies, and object usage statistics, and, based on the analysis, determine the appropriate action to ensure that the objects 174 residing on the various devices are properly governed. In one embodiment, the information governance analysis may be run on the data loss protection replicas rather than on the individual devices from both a resource availability and ease of deployment/management points of view. Because end-users are typically concerned about losing the information stored on their devices, they are incented to use the data loss protection process, which includes backup, archive, remote replication, continuous data protection (CDP) etc. Such data can then be utilized in the governance process.

Figure 3:
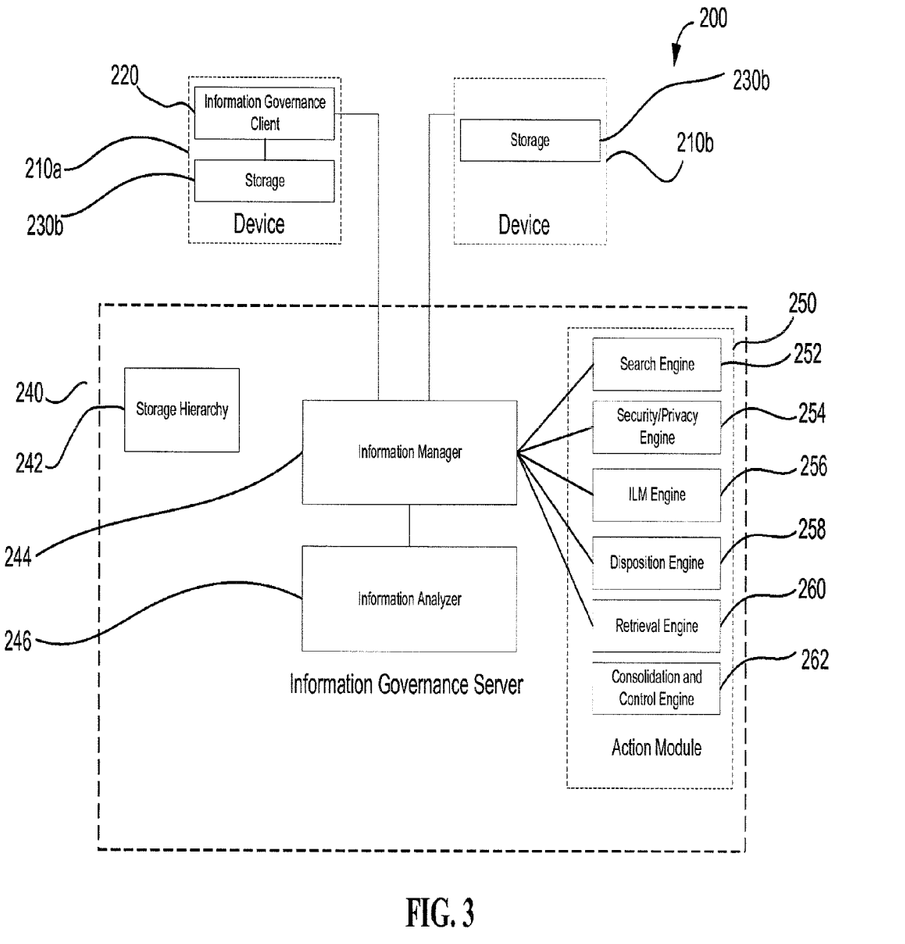
FIG. 3 illustrates a block diagram of an information governance system in accordance with one embodiment of the present invention.

FIG. 3 illustrates a block diagram of an information governance system 200 in accordance with one embodiment of the present invention. It should be appreciated that the blocks in the block diagram described herein may represent hardware and/or software and it should be further appreciated that any suitable system that can implement the methodology described herein may be utilized. In one embodiment, the system 200 includes device(s) such as, for example, devices 210a and 210b. It should be appreciated that the devices 210a and 210b may be any suitable device that can store data and/or where an information governance client may be run. A device that does not run an information governance client may have reduced governance capabilities. It should also be appreciated that any suitable number of devices may be included in the system 200 such as, for example, 1, 2, 3, 4, 5, 6, 7, 8, 9, 10, etc. It should also be appreciated that any suitable type of devices may be utilized in the system 200 such as, for example, PCs, servers, storage devices, PDA's, cellular telephones, portable computing devices, etc.

The device 210a includes information governance client 220a and storage device 230a, and the device 210b includes storage device 230b. Each of the devices 210a and 210b may communicate with an information governance server 240. In one embodiment, the information governance server 240 includes a storage hierarchy 242, an information manager 244, an information analyzer 246 and an action module 250. The storage hierarchy 242 may be connected to the information manager 244 which may communicate with the devices 210a and 210b as well as with the information analyzer 246. The information manager may also communicate with the action module 250. In one embodiment, the action module 250 may include a search engine 252, a security/privacy engine 254, an ILM engine 256, a disposition engine 258, a retrieval engine 260, and a consolidation and control engine 262. In one embodiment, the information manager includes an input module through which inputs may be received from user or administrator regarding desired information governance policies and outcomes.

In one embodiment as shown in FIG. 3, the system 200 may include the information governance client 220a which resides on the device 210a to be governed. The information governance client 220a extracts objects (e.g., files, documents, records, tables, databases), device characteristics (e.g., mobile device, password-protected device, device with physical security, device in secured area, network connectivity of device), object management policies (e.g., access control information, encryption information, retention information) and usage patterns (e.g., last access and/or last modified time, access frequency, update frequency) of the objects, etc. from the device being governed and forwards them to the information governance server 240. As needed, such as during a search or data restore operation, the information governance client 210a retrieves objects from the information governance server. In one embodiment, the information governance client 210a, under direction from the information governance server 240, may communicate information directly with another information governance client.

In one embodiment, the information governance server 240 includes one or more servers, which may be geographically distributed. The information governance server 240 may store the objects received from the information governance client 220 in the storage hierarchy 242 which can consist of one or more levels of storage devices such as disks, optical media, tape etc. The information governance server may also request objects directly from devices such as 210b that do not run an information governance client. In one embodiment, one of the functions of the information governance server 240 is to provide a backup copy of the objects residing on the devices 210a and 210b being governed.

In an exemplary embodiment, the information manager 244 may track the objects that have been received and stored in the information governance server 240. Among the information the information manager 244 may maintain are the device(s) an object resides in, the characteristics of the devices, and the object management policies and usage statistics of the object. The information manager 244 may also record the analysis results produced by the information analyzer 246. The information manager 244 may further manage the storage of the objects in the storage hierarchy 242 and provide the ability to retrieve the objects from the storage hierarchy 242.

In one embodiment, the information analyzer 246 may analyze the information collected from the devices being governed and produce analysis results from which actions can be taken to ensure that the objects residing on the devices are properly governed. In one embodiment, the information analyzer 246 may include the ability to identify whether two objects are identical or similar, and to count the number of copies of an object. In one exemplary embodiment, the information analyzer 246 may include the capability to determine whether confidential/private information is included in an object. In another embodiment, the information analyzer 246 may include the capability to detect semantic concepts in and across objects (e.g., IBM Marvel). In yet another embodiment, the information analyzer 244 may include an extensible information mining framework such as, for example, IBM Unstructured Information Management Architecture (UIMA).

In one embodiment the action module 250 includes a query capability by usage of the search engine 252 through which a user with the appropriate permission can search for objects. The query capability may leverage the analysis performed by the information analyzer 246 to enable semantic searching, i.e., searching for objects based on semantic content. In one embodiment, the query capability may take into account the access control specified at the devices being governed to determine which objects can be identified to the user performing the query.

In one embodiment, a user may retrieve one or more of the search results through the retrieval engine 260, which may also be used for data restore purposes. To retrieve an object, the retrieval engine 260 may consult the information manager 244 to identify the devices containing the object. Based on the properties of the devices (e.g., online, connected, local to user conducting retrieval) and the attributes associated with the copies of the object (e.g., last modified time, hash value), the retrieval engine 260 may select a particular copy to respond with. If the retrieval of the selected copy fails (e.g., the device becomes disconnected) or the selected copy turns out to be different, the retrieval engine 260 may retry with another selection.

In one embodiment, the retrieval engine 260 instructs the information governance client on the selected source device to send the requested object directly to the information governance client on the target device. In one embodiment, the action module 250 may include a policy engine (e.g., the security/privacy engine 254) that checks for violations of specified information governance policies, and sends notification (e.g. through electronic mail, instant message, pager, on-screen message, audible warning) to user associated with device/object in violation and/or the compliance/security officer. In one embodiment, the policy engine looks for security/privacy risks, such as confidential information being stored unencrypted on a mobile device. In one embodiment, the action module includes a visualization tool that can be used to depict the security/privacy risks.

In one embodiment, the a 250 includes a disposition function (e.g., the disposition engine 258) whereby a user or administrator can submit a disposition command for an object and the module will identify identical or similar copies of the object. In one embodiment, the disposition function monitors the retention period of objects on the various devices and notifies (e.g. through electronic mail, instant message, pager, on-screen message, audible warning) a user and/or supervisor and/or administrator associated with a particular object when the retention period of the object has expired. In one embodiment, the disposition function monitors the disposition of objects on the various devices and notifies the user associated with a particular disposition when there are other identical or similar copies of the object on other devices. In one embodiment, the monitoring and notification is performed only when the disposition occurs on identified devices. In one embodiment, the object is considered as having expired when the a retention period is expired for the object or the object is deleted from a device.

In one embodiment, the action module 250 includes the information lifecycle management (ILM) engine 256 that considers the information collected from the devices and the analysis results to determine how best to manage the objects. For example, the ILM engine 256 may decide that if an object was created and last used a long time ago, the object should be archived, and that if the object contains confidential information or that a server copy of it exists, that the object should be deleted from a mobile device. The ILM engine also uses the information to evaluate the number of online, nearline, and offline copies to be maintained for data loss protection purposes, and how to distribute the desired number of online, nearline, and offline copies among the devices.

In one embodiment, the action module 250 may include the consolidation and control engine 262 that has the capability to project when storage space on a device will become fully utilized. In one embodiment, the consolidation and control engine 262 may classify objects by the application needed to operate on (e.g., create, edit, view) them, and to determine the importance of various resources (e.g., software) to the organization and recommendations for future expenditure. In one embodiment, the consolidation and control engine 262 may locate similar and/or derived works corresponding to an object, or in yet another embodiment, identify the devices containing a malicious object (e.g. infected electronic mail attachment).

Figure 4A:
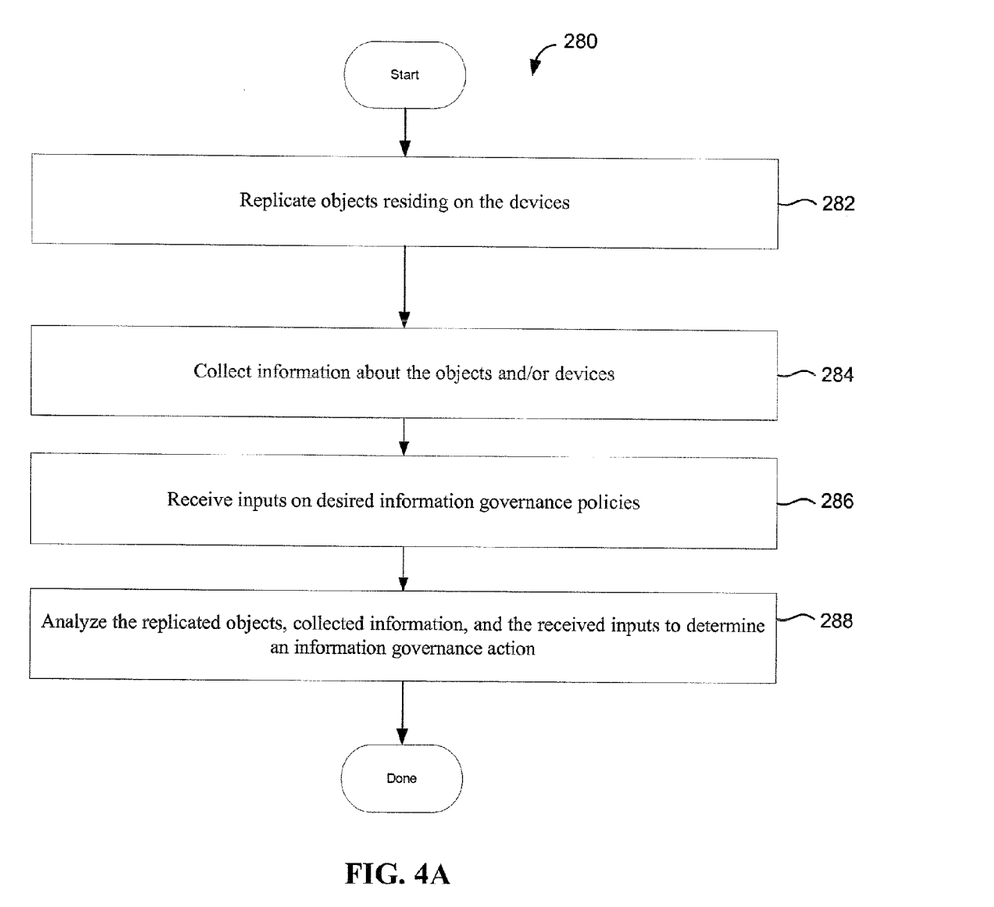
FIG. 4A shows a flowchart illustrating a method for effecting information governance in accordance with one embodiment of the present invention.

FIG. 4A shows a flowchart 280 illustrating a method for effecting information governance in accordance with one embodiment of the present invention. It should be understood that the processes depicted in the flowchart 280 and the other flowcharts herein may be implemented in hardware or in program instruction form written in any suitable computer readable media. For instance, the program instructions can be in the form of software code developed using any suitable type of programming language. For completeness, the process flow of FIG. 4A will illustrate an exemplary process whereby information is governed in an intelligent and powerful manner so data is stored, restored, removed, and processed in accordance with desired information governance policies.

In one embodiment, the flowchart 280 begins with operation 282 where objects (e.g., files, documents, records, tables, databases) residing on various devices in a network (e.g., servers, workstations, PCs, tablet PCs, laptops, PDAs, cellular telephones) are replicated. In one embodiment, the replicated objects are used for data loss protection purposes (e.g. backup, archives remote replication, CDP). After operation 282, the method proceeds to operation 284 which collects information about the objects and/or devices. In one embodiment, the information collected includes attributes of the devices (e.g., mobile device, password-protected device, device with physical security, device in secured area, network connectivity of device), policies for managing the objects on the devices (e.g., access control information, encryption information, retention information), and usage statistics of the objects (e.g., last access and/or last modified time, access frequency, update frequency).

Then at operation 286, inputs are received from user or administrator regarding the desired information governance policies and outcomes. After operation 286, the method proceeds to operation 288 where the replicated objects, collected information, and received inputs are analyzed to determine an information governance action. Operation 288 is discussed in further detail in reference to FIG. 4B. In one embodiment, the information governance action is associated with a desired policy to ensure that the objects residing on the various devices are governed in accordance with the policy.

Figure 4B:
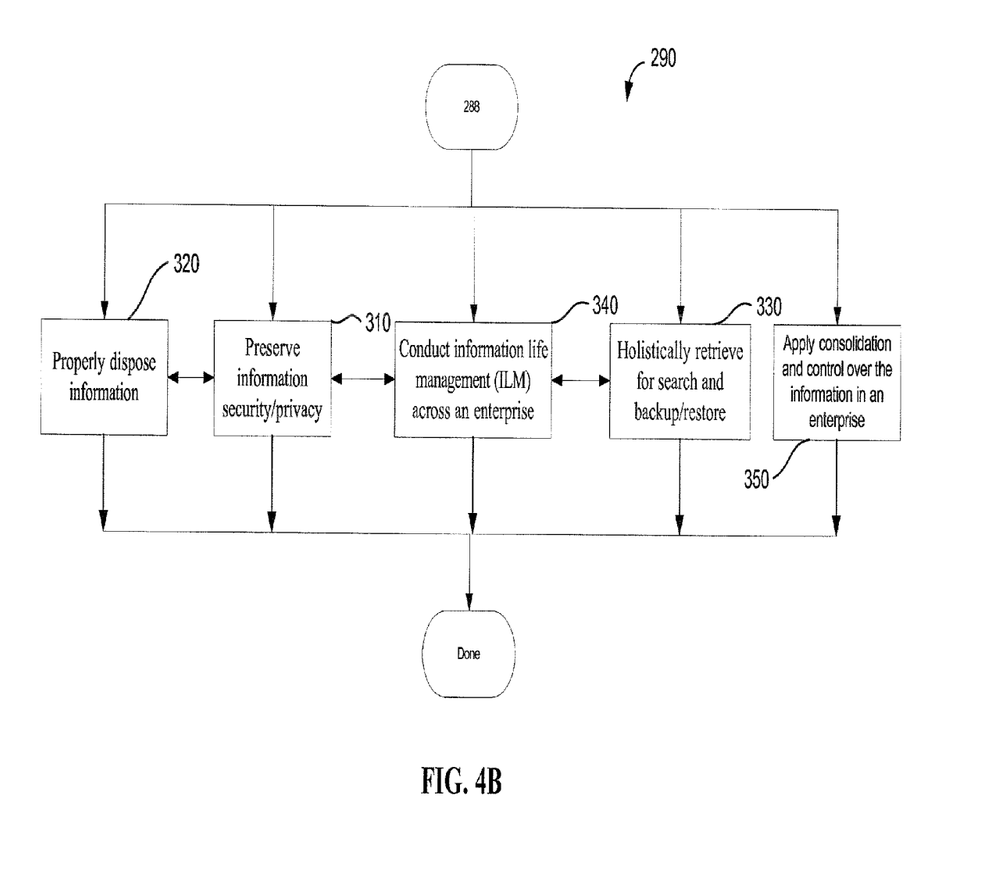
FIG. 4B shows a flowchart defining a method for analyzing the replicated objects, collected information, and received inputs to determine an information governance action in accordance with one embodiment of the present invention.

FIG. 4B shows a flowchart 290 defining a method for analyzing the replicated objects, collected information, and received inputs to determine an information governance action in accordance with one embodiment of the present invention. In one embodiment, the flowchart 290 moves from operation 288 as described above in reference to FIG. 4A and continues to at least one of operations 310, 320, 330, 340, and/or 350. It should be appreciated that any one or a suitable combination/order of operations 310, 320, 330, 340, and/or 350 may be utilized.

In one embodiment, operation 310 preserves information security/privacy. One exemplary embodiment of operation 310 is discussed in further detail in reference to FIG. 5.

In one embodiment, operation 320 properly, disposes of information. An exemplary embodiment of operation 320 is discussed in further detail in reference to FIG. 6.

In one embodiment, operation 330 holistically retrieves for search or backup/restore. One exemplary embodiment of operation 330 is discussed in further detail in reference to FIG. 7.

In one embodiment, operation 340 conducts information life management across a network/enterprise. An exemplary embodiment of operation 340 is discussed in further detail in reference to FIG. 8.

In one embodiment, operation 350 applies consolidation and control over the information in a network/enterprise. In one embodiment, operation 350 includes projecting when storage space on a device will become fully utilized. In one embodiment, operation 350 includes classifying objects by the application needed to operate on (e.g., create, edit, view) them, and determining the importance of various resources (e.g., software) to the organization and recommendations for future expenditure. In one embodiment, operation 350 includes locating similar and/or derived works corresponding to an object, or in yet another embodiment, identifying the devices containing a malicious object (e.g. infected electronic mail attachment).

Figure 5:
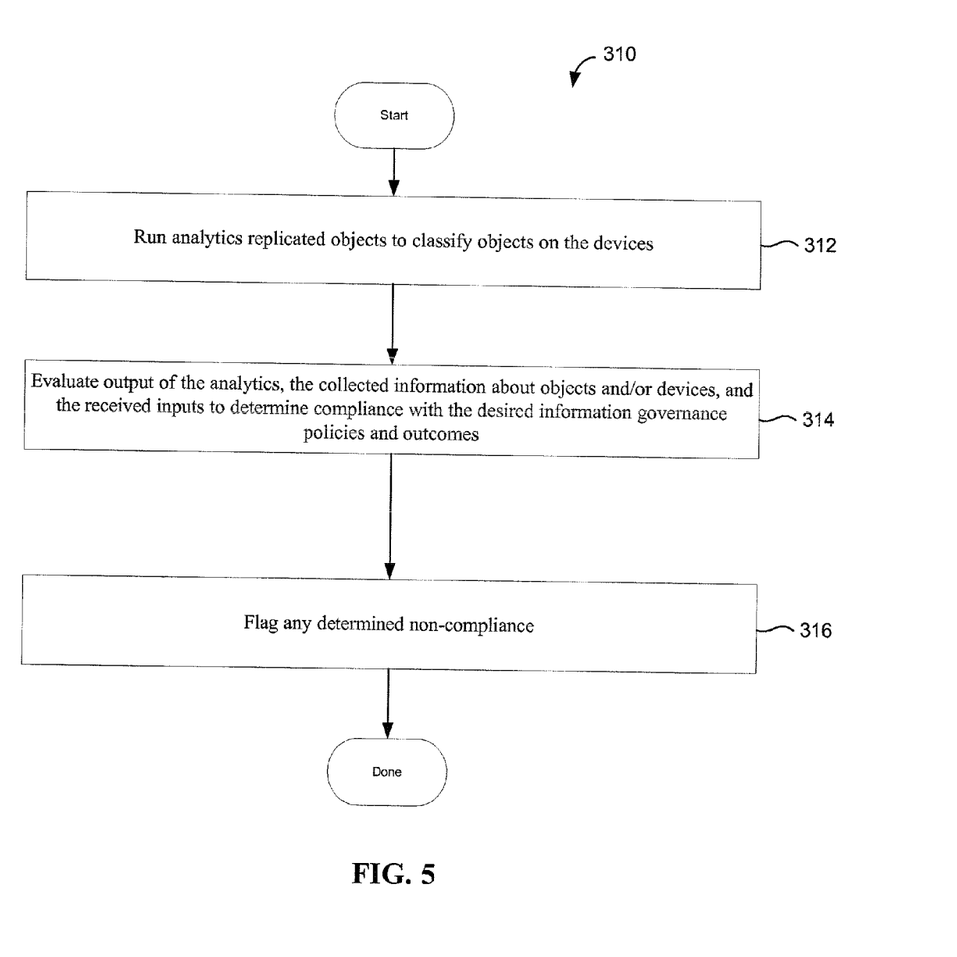
FIG. 5 shows a flowchart defining a method for preserving information security/privacy in accordance with one embodiment of the present invention.

FIG. 5 shows a flowchart 310 defining a method for preserving information security/privacy in accordance with one embodiment of the present invention. Flowchart 310 begins with operation 312 which runs analytics on the replicated objects to classify the objects on the devices. In one exemplary example of operation 312, the method may identify objects containing confidential information. In one embodiment, operation 312 includes identifying objects containing information private to a user, and objects containing information confidential to an organization. In one embodiment, operation 312 includes identifying objects that are private and/or confidential to various degrees (e.g. unauthorized disclosure would compromise national security, unauthorized disclosure would result in loss of revenue, unauthorized disclosure would embarrass management).

After operation 312, the method moves to operation 314 where the output of the analytics, the collected information about objects and/or devices, and the received inputs are evaluated to determine compliance with the desired information governance policies and outcomes. As an example, a policy may specify that social security numbers must be encrypted. Another policy may require that confidential objects be on mobile devices such as laptops only on a needed basis. In one embodiment, operation 314 includes identifying any object that has been classified as confidential and that the collected information indicates has not been accessed within a predetermined number of days and is residing encrypted on a mobile device. In one embodiment, the desired information governance policies are associated with governmental regulations such as Health Insurance Portability and Accountability Act (HIPAA) and security breach notification laws.

At operation 316, any identified non-compliance with the desired information governance policies and outcomes are flagged. In one embodiment, operation 316 includes issuing a warning to a user and/or supervisor and/or compliance officer through an information governance client, electronic mail, instant message, pager, audible signal, etc. In one embodiment, a method of flagging non-compliance is based on the desired information governance policies and outcomes.

Figure 6:
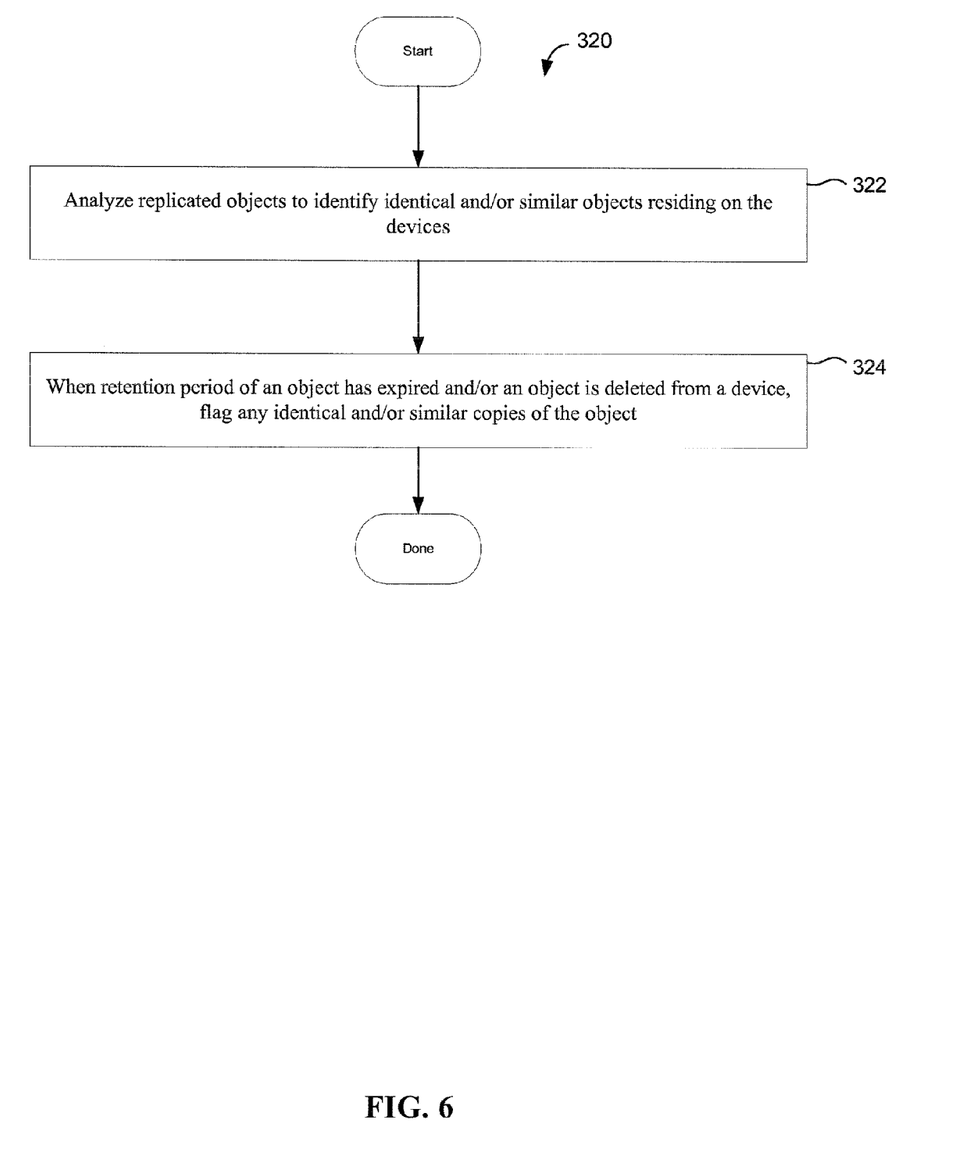
FIG. 6 shows a flowchart which defines a method for properly disposing of information in accordance with one embodiment of the present invention.

FIG. 6 shows a flowchart 320 which defines a method for properly disposing of information in accordance with one embodiment of the present invention.

Flowchart 320 begins with operation 322 where identical and/or similar objects residing on the devices are identified by analyzing the replicated objects. In one embodiment of operation 322, a hash function is computed for each replicated object and identical objects are identified by comparing the resulting hash values. In one embodiment of operation 322, multiple hash functions are computed for each replicated object yielding a set of resulting hash values for each replicated object, and similar objects are identified by determining the overlap in the sets of resulting hash values. In one embodiment, operation 322 includes maintaining an inventory of the objects residing on the various devices based on the analysis results.

At operation 324, when the retention period of an object has expired and/or an object is deleted from a device, any identical and/or similar copy of the object is flagged. In one embodiment, any identical and/or similar copy of the object is flagged only when the retention period of the object has expired on an identified device and/or the object is deleted from an identified device. In one embodiment, an identified device includes a server. In one embodiment, operation 324 includes notifying a user and/or supervisor and/or compliance officer through an information governance client, electronic mail, instant message, pager, audible signal, etc. In one embodiment, a method of notification is based on the desired information governance policies and outcomes.

Figure 7:
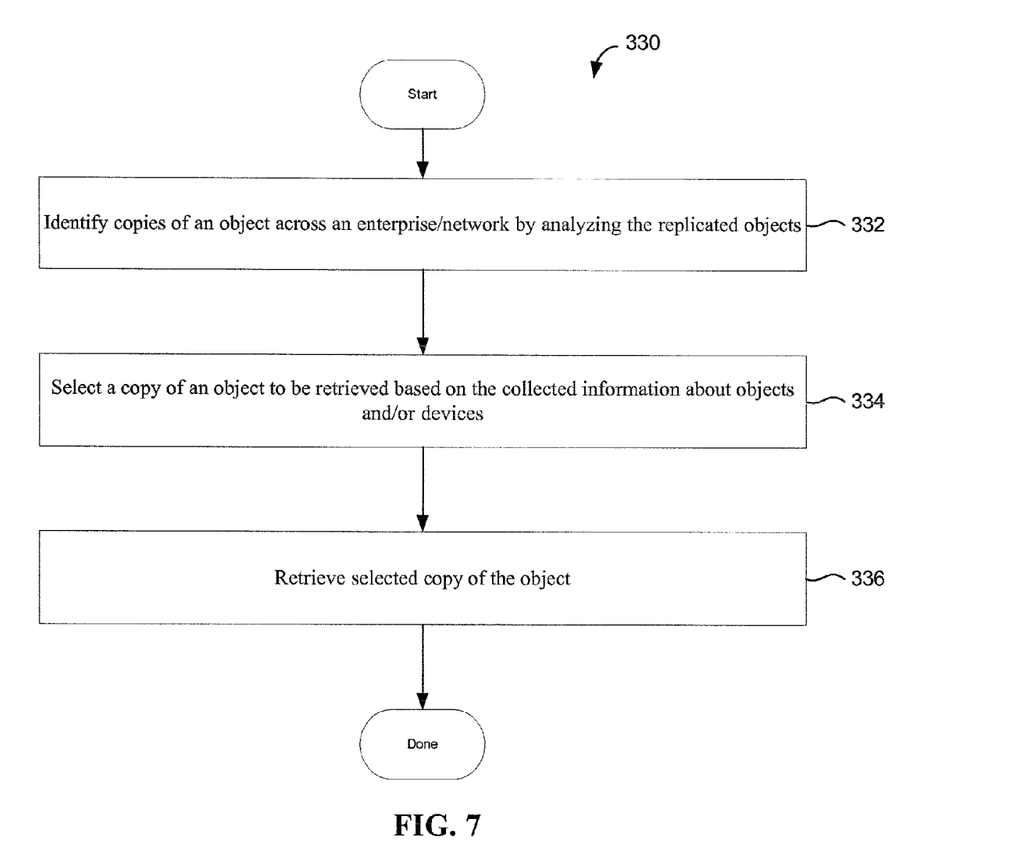
FIG. 7 depicts a flowchart which defines a method for holistically retrieving information for search and/or backup/restore in accordance with one embodiment of the present invention.

FIG. 7 depicts a flowchart 330 which defines a method for holistically retrieving information for search and/or backup/restore in accordance with one embodiment of the present invention. In one embodiment, the flowchart 330 begins with operation 332 where copies of an object are identified across the network/enterprise by analyzing the replicated objects. In one embodiment of operation 332, a hash function is computed for each replicated object and copies of an object are identified by comparing the resulting hash values. In one embodiment, operation 332 includes maintaining an inventory of the objects residing on the various devices based on the analysis results.

After operation 332, the method proceeds to operation 334 where a copy of an object to be retrieved is selected based on the collected information about objects and/or devices. In one embodiment, the copy of the object to be retrieved is selected based on the collected device properties. For example, a copy of the object that resides on a server that is well-connected and near to the requesting device would be selected over a copy of the object that resides on a mobile device or a device connected to the requesting device via a slow link. In another example, if an object is both on tape and a connected laptop, the copy of the object on the laptop may be selected. In yet another example, if an object to be retrieved exists on the device requesting the object, then the copy local to the device requesting the object would be selected.

After operation 334, the method advances to operation 336 where the selected copy of the object is retrieved. If the retrieval of the selected copy fails (e.g., the device becomes disconnected) or the selected copy turns out to be different, operation 334 may be repeated to select a second copy of the object.

Figure 8:
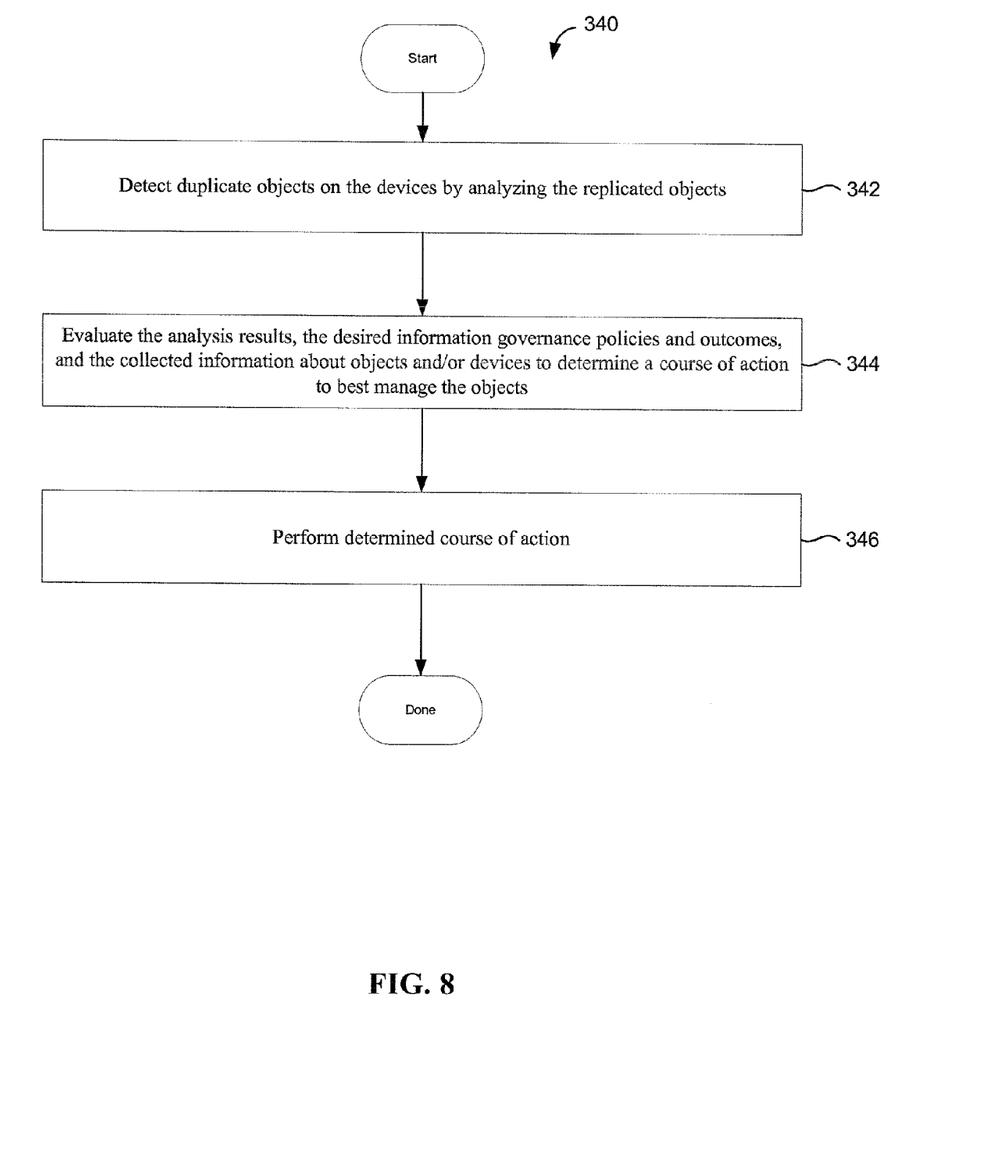
FIG. 8 depicts a flowchart which defines a method for conducting information life management across an enterprise in accordance with one embodiment of the present invention.

FIG. 8 depicts a flowchart 340 which defines a method for conducting information life management (ILM) across an enterprise in accordance with one embodiment of the present invention. In one embodiment, flowchart 340 begins with operation 342 which detects duplicate objects residing on the devices by analyzing the replicated objects.

After operation 342, the method proceeds to operation 344 where the analysis results, the desired information governance policies and outcomes, and the collected information about the objects and/or devices are evaluated to determine course of action to best manage the objects on the devices. For example, if an object was created and last used a long time ago, the object should be archived. In one embodiment, operation 344 includes determining the number of online, nearline, and offline copies to be maintained for each object, and how to distribute the desired number of online, nearline, and offline copies among the devices.

After operation 344, the method moves to operation 346 where the course of action determined at operation 344 is carried out. In one embodiment, operation 346 includes notifying a user and/or administrator about the determined course of action.

In one embodiment of the method defined by flowchart 340, analytics are run on the replicated objects to classify the objects residing on the devices. In one embodiment, the method defined by flowchart 340 includes identifying objects containing information private to a user, and/or objects containing information confidential to an organization, and such classification is used in determining how best to manage the objects. For example, if an object contains confidential information and that a server copy of it exists, that the object should be deleted from a mobile device.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, magnetic disks, magnetic tapes, CDs, DVDs and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details giver herein, but may be modified within the scope and equivalents of the appended claims.

What is claimed is:

1. A method to manage data located on networked devices, comprising:

replicating objects residing on the networked devices by extracting and forwarding the objects residing on the networked devices to an information governance server, and storing the extracted and forwarded objects on the information governance server as replicated objects;

collecting information about at least one of the objects or the networked devices;

receiving input on desired information governance policies and outcomes;

analyzing the replicated objects stored on the information governance server, wherein analyzing further comprises detecting semantic concepts in objects, detecting semantic concepts across objects, and searching the objects based on semantic content of the objects; and determining an information governance action based on the collected information, the received input and the analysis of the replicated objects.

2. The method to manage data located on networked devices as recited in claim 1, wherein the collected information includes at least one of attributes of the networked devices, policies for managing the objects on the networked devices, or usage statistics of the objects.

3. The method to manage data located on networked devices as recited in claim 1, wherein the objects are replicated as part of a data loss protection process, and wherein the information governance action comprises one or more of distribution of objects, archiving of objects and deletion of objects.

4. The method to manage data located on networked devices as recited in claim 1, wherein the object is one of a file, a document, a record, a table, or a database.

5. The method to manage data located on networked devices as recited in claim 1, wherein the networked devices include a governance client and a storage device, and the information governance action is associated with one of the desired information governance policies to ensure that the objects residing on the various networked devices are governed in accordance with the policy.

6. The method to manage data located on networked devices as recited in claim 1, wherein the information governance action includes:

properly disposing information, preserving information security and information privacy, conducting information life management across the network, holistically retrieving information for one of a search operation or a restore operation, and applying consolidation and control over the information in the network.

7. The method to manage data located on networked devices as recited in claim 6, wherein properly disposing information includes, analyzing the replicated objects stored on the information governance server to identify identical objects residing on the networked devices, and flagging any identical copy of an object when the object has expired.

8. The method to manage data located on networked devices as recited in claim 6, wherein preserving information security and information privacy includes, running analytics on the replicated objects stored on the information governance server to identify confidential objects based on object classification, evaluating compliance with the desired information governance policies based on the results of running the analytics and the collected information, wherein the desired governance policies are associated with government regulations, and flagging non-compliance with the policies.

9. The method to manage data located on networked devices as recited in claim 6, wherein conducting information life management across the network includes, detecting duplicate objects residing on the networked devices by analyzing the replicated objects stored on the information governance server, evaluating a number of online, nearline, and offline copies needed for each of the objects and determining distribution for the number of online, nearline, and offline copies based on the collected information and the received input, determining a course of action to achieve the determined number of online, nearline and offline copies.

10. The method to manage data located on networked devices as recited in claim 6, wherein holistically retrieving information includes, analyzing the replicated objects stored on the information governance server to identify identical objects residing on the networked devices, and selecting a copy of an object to be retrieved based on the collected information, and retrieving the selected copy.

11. The method to manage data located on networked devices as recited in claim 1, wherein the determination of the information governance action is based on the analysis of the replicated objects stored on the information governance server, the collected information and the received input.

12. A non-transitory computer readable media having program instructions for managing data located on networked devices, the computer readable media comprising:

program instructions for replicating objects residing on the networked devices and storing the replicated objects on an information governance server;

program instructions for collecting information about at least one of the objects or the networked devices;

program instructions for receiving input on desired information governance policies and outcomes;

program instructions for analyzing the replicated objects stored on the information governance server, wherein analyzing further comprises detecting semantic concepts in objects, detecting semantic concepts across objects, and searching the objects based on semantic content of the objects; and program instructions for determining an information governance action based on the collected information, the received input and the analysis of the replicated objects.

13. The computer readable media as recited in claim 12, wherein the collected information includes at least one of attributes of the networked devices, policies for managing the objects on the networked devices, and usage statistics of the objects.

14. The computer readable media as recited in claim 12, wherein the objects are replicated as part of a data loss protection process.

15. The computer readable media as recited in claim 12, wherein the object is one of a file, a document, a record, a table, or a database.

16. The computer readable media as recited in claim 12, wherein the networked devices include a governance client and a storage device, and the information governance action is associated with one of the desired information governance policies to ensure that the objects residing on the various networked devices are governed in accordance with the policy.

17. The computer readable media as recited in claim 12, wherein the information governance action includes at least one of, properly disposing information,
preserving information security and information privacy,
conducting information life management across the network,
holistically retrieving information for one of a search operation or a restore operation, or
applying consolidation and control over the information in the network.

18. The compute readable media as recited in claim 17, wherein properly disposing information includes,
analyzing the replicated objects stored on the information governance server to identify identical or similar objects residing on the networked devices, and
flagging any identical copy of an object when the object has expired.

19. The computer readable media as recited in claim 17, wherein preserving information security and information privacy includes,
running analytics on the replicated objects stored on the information governance server to identify confidential objects based on object classification,
evaluating compliance with the desired information governance policies based on the results of running the analytics and the collected information, wherein the desired governance policies are based on networked device attributes, and
flagging non-compliance with the policies.

20. The computer readable media as recited in claim 17, wherein conducting information life management across the network includes, detecting duplicate objects residing on the networked devices by analyzing the replicated objects stored on the information governance server, evaluating a number of online, nearline, and offline copies needed for each of the objects based on the collected information and the received input, determining distribution for the number of online, nearline, and offline copies, and determining a course of action to achieve the determined number of online, nearline and offline copies.

21. The computer readable media as recited in claim 17, wherein holistically retrieving information includes, analyzing the replicated objects stored on the information governance server to identify identical objects residing on the networked devices, and selecting a copy of an object to be retrieved based on the collected information, and retrieving the selected copy.

22. The computer readable media as recited in claim 17, wherein the determination of the information governance action is based on the analysis of the replicated objects stored on the information governance server, the collected information and the received input.

23. A system for managing data located on networked devices, comprising:
an information governance server for communicating with all the networked devices, the information governance server comprising:
an information manager for replicating objects residing on the networked devices and storing the replicated objects on the information governance server, collecting information about at least one of the objects or the networked devices, and receiving input on desired information governance policies and outcomes;
an information analyzer for analyzing the replicated objects stored on the information governance server, wherein analyzing further comprises detecting semantic concepts in objects, detecting semantic concepts across objects, and searching the objects based on semantic content of the objects; and
an action module for determining an information governance action based on the collected information, the received input, and the analysis of the replicated objects stored on the information governance server.

24. The system for managing data located on networked devices as recited in claim 23, wherein the collected information includes at least one of attributes of the networked devices, policies for managing the objects on the networked devices, and usage statistics of the objects.

25. The system for managing data located on networked devices as recited in claim 23, wherein the objects are replicated as part of a data loss protection process.

26. The system for managing data located on networked devices as recited in claim 23, wherein the object is one of a file, a document, a record, a table, or a database.

27. The system for managing data located on networked devices as recited in claim 23, wherein the networked devices include a governance client and a storage device, and the information governance action is associated with one of the desired information governance policies to ensure that the objects residing on the various networked devices are governed in accordance with the policy.

28. The system for managing data located on networked devices as recited in claim 23, wherein the information governance action includes at least one of, properly disposing information, preserving information security and information privacy, conducting information life management across the network, holistically retrieving information for one of a search operation or a restore operation, or applying consolidation and control over the information in the network.

29. The system for managing data located on networked devices as recited in claim 28, wherein properly disposing information includes, analyzing the replicated objects stored on the information governance server to identify identical objects residing on the networked devices, and flagging the identical copy of an object when the object is expired.

30. The system for managing data located on networked devices as recited in claim 28, wherein preserving information security and information privacy includes, running analytics on the replicated objects stored on the information governance server to identify confidential objects based on object classification, evaluating compliance with the desired information governance policies based on the results of running the analytics and the collected information, and flagging non-compliance with the policies, wherein the desired governance policies are based on device attributes and device usage statistics.

31. The system for managing data located on networked devices as recited in claim 28, wherein conducting information life management across the network includes, detecting duplicate objects residing on the networked devices by analyzing the replicated objects stored on the information governance server, evaluating a number of online, nearline, and offline copies needed for each of the objects based on the collected information and the received input, determining distribution for the number of online, nearline, and offline copies, and determining a course of action to achieve the determined number of online, nearline and offline copies.

32. The system for managing data located on networked devices as recited in claim 28, wherein holistically retrieving information includes, analyzing the replicated objects stored on the information governance server to identify identical objects residing on the networked devices, and selecting a copy of an object to be retrieved based on the collected information, and retrieving the selected copy.

33. An information governance system to assist in managing data located on networked devices, the information governance system comprising:
- an information governance server configured for:
  - replicating objects residing on the networked devices and storing the replicated objects on the information governance server;
  - collecting information about at least one of the objects or the networked devices;
  - receiving input on desired information governance policies and outcomes;
  - analyzing the replicated objects stored on the information governance server, wherein analyzing further comprises detecting semantic concepts in objects, detecting semantic concepts across objects, and searching the objects based on semantic content of the objects; and
  - determining an information governance action based on the collected information, the received input and the analysis of the replicated objects.

34. The information governance system as recited in claim 33, wherein the collected information includes at least one of attributes of the networked devices, policies for managing the objects on the networked devices, and usage statistics of the objects.

35. The information governance system as recited in claim 33, wherein the objects are replicated as part of a data loss protection process.

36. The information governance system as recited in claim 33, wherein the object is one of a file, a document, a record, a table, or a database.

37. The information governance system as recited in claim 3, wherein the networked devices include a governance client and a storage device, and the information governance action is associated with one of the desired information governance policies to ensure that the objects residing on the various networked devices are governed in accordance with the policy.

38. The information governance system as recited in claim 33, wherein the information governance action includes at least one of, properly disposing information, preserving information security and information privacy, conducting information life management across the network, holistically retrieving information for one of a search operation or a restore operation, or applying consolidation and control over the information in the network.

39. The information governance system as recited in claim 38, wherein properly disposing information includes, analyzing the replicated objects stored on the information governance server to identify identical objects residing on the networked devices, and flagging any identical copy of an object when the object is expired.

40. The information governance system as recited in claim 38, wherein preserving information security and information privacy includes, running analytics on the replicated objects stored on the information governance server to identify confidential objects based on object classification, evaluating compliance with the desired information governance policies based on the results of running the analytics and the collected information, wherein the desired governance policies are based on networked device attributes, and flagging non-compliance with the policies.

41. The information governance system as recited in claim 38, wherein conducting information life management across the network includes, detecting duplicate objects residing on the networked devices by analyzing the replicated objects stored on the information governance server, evaluating a number of online, nearline, and offline copies needed for each of the objects based on the collected information and the received input, determining a course of action to achieve the determined number of online, nearline and offline copies including determining distribution the number of online, nearline, and offline copies among the networked devices.

42. The information governance system as recited in claim 38, wherein holistically retrieving information includes, analyzing the replicated objects stored on the information governance server to identify identical objects residing on the networked devices, and selecting a copy of an object to be retrieved based on the collected information, and retrieving the selected copy.

* * * * *